(12) United States Patent
Bull et al.

(10) Patent No.: US 7,904,485 B2
(45) Date of Patent: Mar. 8, 2011

(54) GRAPHICAL REPRESENTATION OF ASSETS STORED ON A PORTABLE MEDIA DEVICE

(75) Inventors: William Bull, Campbell, CA (US); Kourtny Minh Hicks, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 12/036,954

(22) Filed: Feb. 25, 2008

(65) Prior Publication Data
US 2009/0070363 A1 Mar. 12, 2009

Related U.S. Application Data

(60) Provisional application No. 60/967,566, filed on Sep. 6, 2007.

(51) Int. Cl.
G06F 7/00 (2006.01)
G06F 17/30 (2006.01)
(52) U.S. Cl. .................... 707/802; 707/805; 715/203
(58) Field of Classification Search .......... 707/600–831; 715/200, 203, 204, 700, 730, 734, 744; 725/40; 345/156, 530
See application file for complete search history.

(56) References Cited

U.S. PATENT DOCUMENTS

| | | | | |
|---|---|---|---|---|
| 6,947,959 B1 * | 9/2005 | Gill | .............................. | 715/202 |
| 7,593,782 B2 * | 9/2009 | Jobs et al. | ....................... | 700/94 |
| 7,685,163 B2 * | 3/2010 | Chaudhri | ...................... | 715/253 |
| 2001/0030667 A1 | 10/2001 | Kelts | | |
| 2006/0153040 A1 * | 7/2006 | Girish et al. | ............... | 369/59.21 |

OTHER PUBLICATIONS

Hoganson et al., Lectures for Mobile Devices, Evaluating "iPod/PDA-casting" Technology and Pedagogy, Apr. 16, 2007, IEEE, 323-328.*
Wei-Shun Liao et al., Mobile Media Content Sharing in UPnP-Based Home Network Environment, Feb. 12, 2007, IEEE, 4 pages.*

* cited by examiner

*Primary Examiner* — Jean B Fleurantin
(74) *Attorney, Agent, or Firm* — Kilpatrick Townsend & Stockton LLP (57) ABSTRACT

A user interfaces can deliver enhanced information regarding media assets stored on a portable media device. A graphical user interface for database browsing and navigation can include a list of values of a metadata item and a graphical representation of the distribution of media assets across the values on the list, such as a pie chart where the size of different wedges reflects the fraction of media assets having a particular value. As a user browses a list, the graphical representation can be modified to emphasize the correspondence between different graphical elements and different entries on the list.

23 Claims, 7 Drawing Sheets

GRAPHICAL REPRESENTATION OF ASSETS STORED ON A PORTABLE MEDIA DEVICE

CROSS-REFERENCES TO RELATED APPLICATIONS

This application claims the benefit of U.S. Provisional Patent Application No.: 60/967,566 entitled "Graphical Representation of Assets", filed on Sep. 4, 2007, and which disclosure is incorporated herein by reference in its entirety.

FIELD OF THE INVENTION

The present invention relates generally to media devices and more particularly, to techniques for navigating content and information using a media device.

BACKGROUND OF THE INVENTION

A portable media device ("PMD") stores media assets, such as audio tracks, video tracks or photos that can be played or displayed on the portable media device. One example of a portable media device may be the iPod™ portable media device, currently available from Apple Inc. of Cupertino, Calif. Often, a portable media device acquires its media assets from a host computer that serves to enable a user to manage media assets. As an example, the host computer can execute a media management application to manage media assets.

One example of a media management application may be iTunes®, produced by Apple Inc. Once a user has interfaced with the media management application, the portable media device may provide additional applications which may provide further media management capabilities, allowing the user to navigate, arrange, or playback particular media assets. These further media management capabilities may use the display of the portable media device to interface with the user.

Due to the ease with which audio tracks and video tracks may be downloaded from online sources, stored, and played back on portable media devices such as the iPod™, large numbers of stored tracks can be available on a PMD. Large numbers of tracks of differing types, whose residency on a PMD may be transitory, create a substantial navigation and management challenge for the user and PMD manufacturer alike. In terms of being able to concisely present an efficient and user friendly interface, it would be highly beneficial to present the user with a graphical interface with a screen presence exemplifying and delineating stored track information in such a way that the user may be able to quickly glean information about content stored on the PMD.

BRIEF SUMMARY OF THE INVENTION

Embodiments of the present invention provide user interfaces that deliver enhanced information regarding media assets stored on a portable media device. The portable media device stores media assets and values of various metadata items (e.g., track name, artist name, genre, media type, etc.) associated with the media assets and provides a graphical user interface for selecting media assets based on values of different metadata items (e.g., selecting by media type, then genre, then artist). At a particular stage of selection, the graphical user interface can include a list of values of a particular metadata item and can further include a graphical representation of the distribution of media assets across the values on the list. For example, the graphical representation can be a pie chart in which each wedge corresponds to a different value of the metadata item, and the size of each wedge can be determined based on a measure of the quantity of media assets associated with the corresponding metadata value. Quantity can be measured by various standards; in one embodiment, the size of a wedge can be proportional to the number of media assets associated with the corresponding metadata value, while in another embodiment, the size of a wedge can be proportional to the track length of the media assets associated with the corresponding metadata value. Other measures of quantity can also be used. In addition, the graphical element corresponding to a particular metadata value can be subdivided to show the proportion of media assets having various values for a different metadata item. As a user browses a list, the graphical representation can be modified to emphasize the correspondence between different graphical elements and different values on the list.

In one aspect, the present invention relates to a method of graphically representing media assets stored on a portable media device. A first portion of a display of the portable media device can present a listing of values of a first metadata item associated with media assets in an initial set of media assets. A second portion of the display can present a graphical representation comprising a number of elements, with each element being associated with a different one of the values of the first metadata item; the relative sizes of the elements represent a distribution of the media assets in the initial set of media assets across the plurality of values of the first metadata item.

In another aspect, the present invention relates to method of graphically representing a playlist of media assets being played on a portable media device. A first portion of a display of the portable media device presents a listing of identifiers of each of the media assets on the playlist. A second portion of the display presents a graphical representation including an element corresponding to each of the media assets on the playlist, wherein a respective size of each element of the graphical representation reflects a duration of the corresponding media asset on the playlist.

In another embodiment, the present invention relates to a graphical user interface for a portable media device having a store of media assets. The graphical user interface includes a user input control, a first display area, a second display area, and a processor. The user input control is operable by a user to make a selection. The first display area is configured to display a list having a number of entries, each entry corresponding to a different one of a number of values for a metadata item. Each of the entries on the list is selectable by operation of the user input control. The second display area is configured to display, in coordination with displaying the list, a graphical representation comprising a number of elements, each element being associated with a different one of the values of the metadata item. Relative sizes of the elements represent a distribution of the media assets across the plurality of values of the first metadata item. The processor is configured to receive a user selection of one of the entries on the list from the user input control and to update the list area and the graphical representation area to highlight both the selected entry and the one of the graphical elements that corresponds to the same value of the metadata item as the selected entry.

The following detailed description, together with the accompanying drawings, will provide a better understanding of the nature and advantages of the present invention.

DETAILED DESCRIPTION OF THE INVENTION

Embodiments of the present invention provide user interfaces that deliver enhanced information regarding media assets stored on a portable media device. The portable media device stores media assets and values of various metadata items (e.g., track name, artist name, genre, media type, etc.) associated with the media assets and provides a graphical user interface for selecting media assets based on values of different metadata items (e.g., selecting by media type, then genre, then artist). At a particular stage of selection, the graphical user interface can include a list of values of a particular metadata item and can further include a graphical representation of the distribution of media assets across the values on the list. For example, the graphical representation can be a pie chart in which each wedge corresponds to a different value of the metadata item, and the size of each wedge can be determined based on a measure of the quantity of media assets associated with the corresponding metadata value. Quantity can be measured by various standards; in one embodiment, the size of a wedge can be proportional to the number of media assets associated with the corresponding metadata value, while in another embodiment, the size of a wedge can be proportional to the track length of the media assets associated with the corresponding metadata value. Other measures of quantity can also be used. In addition, the graphical element corresponding to a particular metadata value can be subdivided to show the proportion of media assets having various values for a different metadata item. As a user browses a list, the graphical representation can be modified to emphasize the correspondence between different graphical elements and different values on the list.

Figure 1:
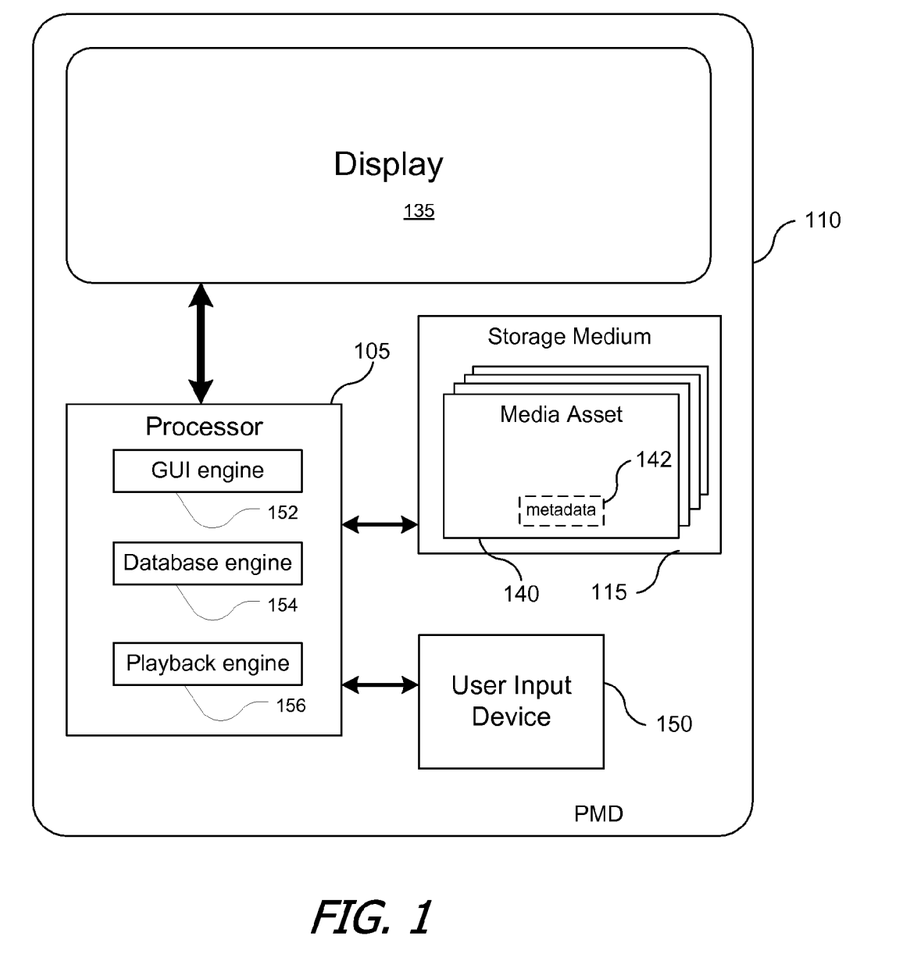
FIG. 1 is a block diagram of a portable media device according to an embodiment of the present invention.

FIG. 1 is a block diagram of portable media device ("PMD") 110 according to an embodiment of the present invention. PMD 100 can include processor 105 coupled to storage medium 115, display 135, and user input device 150.

Processor 105 can also be communicably coupled to one or more user input devices 150 (e.g., touch screen, click wheel, scroll wheel, buttons, knobs, etc.) to receive user input.

Storage medium 115, which can be implemented, e.g., using nonvolatile semiconductor memory, hard disk drive, or the like, stores media assets 140 (also referred to herein as "tracks") in digital form. Assets 140 can include any type of media content that can be stored in digital form and experienced by a user; examples include songs, podcasts, audiobooks, video clips, movies, recorded television or radio broadcasts, photographs, slide shows, other still images, and so on. Each media asset 140 can have metadata 142 associated with it, and metadata 142 can include any data descriptive of characteristics of asset 140. For instance, metadata 142 may include a media type (e.g., music, video, photo, audiobook, podcast, etc.); digital encoding information; track title; track length (e.g., playing time); artist; genre and sub-genre classification; and the like. Some or all of metadata 142 can be specified by a user or automatically created and updated based on user actions. For instance, a user may be able to assign a rating to asset 140 or include asset 140 on a playlist, and metadata 142 associated with each asset 140 may reflect such user operations. As another example, a number of times asset 140 has been played may be stored as metadata 142 and automatically updated by PMD 110 each time asset 140 is played.

In some embodiments, the number of media assets 140 that can be stored is limited only by the capacity of storage medium 115. Given the substantial volume of data storage provided by modern storage media, a large number of assets 140 (e.g., thousands or tens of thousands of tracks, corresponding to tens or hundreds of hours of playback time) may be stored. The large number of stored media assets 140 may create a formidable challenge for a user in understanding how many and/or what types of media assets are stored in PMD 110. Some embodiments of the present invention provide user interface enhancements that can help in addressing this challenge, as described below.

In operation, processor 105 can implement graphical user interface ("GUI") engine 152 as well as database engine 154, and playback engine 156. The various "engines" 152, 154, 156 can each be implemented, e.g., as program code (software or firmware) that is stored in PMD 110 (e.g., in storage medium 115 or other storage not explicitly shown) executable by processor 105. Database engine 154, which can be of conventional design, provides various capabilities related to searching, browsing, and selecting assets 140 or groups of assets 140 from storage medium 115. Playback engine 156, which can also be of conventional design, provides capabilities related to presenting selected media assets 140 from storage medium 115 to a user. In some embodiments, playback engine 156 may provide video portions of media assets 140 to display 135 and/or provide audio portions of media assets 140 to an audio output section (not explicitly shown in FIG. 1).

GUI engine 152, which can provide various user interface features described below, can interact with display 135 and user input device 150 to provide a graphical user interface, allowing a user to control operation of PMD 110. GUI engine 152 can control display 135 to present user interface elements such as text menus, icons or the like, and user input device 150 can be operated by a user to interact with the displayed user interface elements (e.g., selecting or activating an element, thereby giving an instruction to PMD 110). In one embodiment, user input device 150 includes a touch-sensitive element overlaying display 135, providing a touch screen interface. In another embodiment, user input device 150 can include a distinct device such as a click wheel, touch pad, or scroll wheel. In any event, GUI engine 152 can reflect the operation of user input device 150 by updating display 135, e.g., to change which item on a menu is highlighted for selection. The GUI can enable the user to control any aspect of PMD 110, including locating and selecting media assets 140 to be played, controlling playback (e.g., play, pause, fast forward, rewind, etc.), adjusting playback settings (volume, equalizer, etc.), and so on.

In some embodiments PMD 110 can also be connected to a host computer (not shown) that provides additional media management capabilities, including the ability to store additional assets 140 in storage medium 115 and/or to remove assets 140 from storage medium 115. Alternatively, PMD 110 can communicate wirelessly with a source of media assets (e.g., via a wireless connection to the Internet) and can obtain media assets without connecting to a host computer. Thus the assets 140 stored in storage medium 115 may change from time to time.

In accordance with an embodiment of the present invention, assets can be represented graphically in a manner that can provide the user with a better understanding of the content stored on PMD 110.

Figure 2:
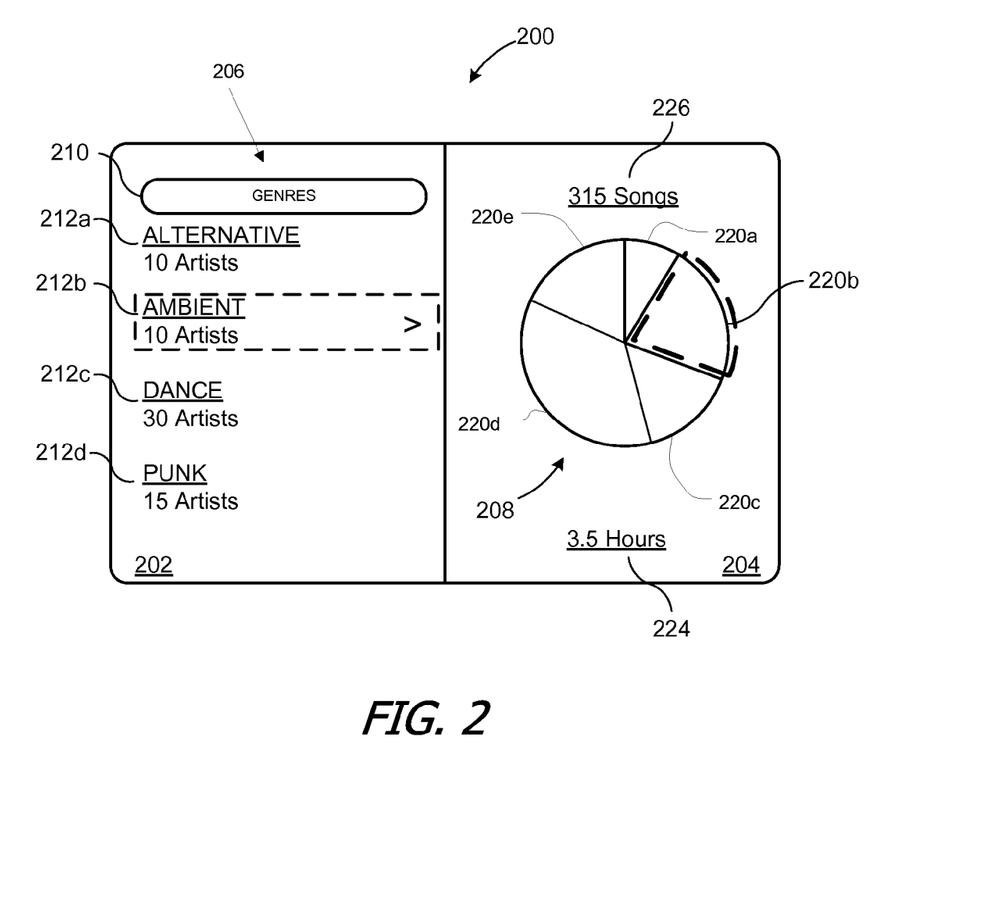
FIG. 2 illustrates a GUI image that can be generated and displayed according to an embodiment of the present invention.

FIG. 2 illustrates GUI image 200 that can be generated by GUI engine 152 and presented on display 135 of PMD 110 according to an embodiment of the present invention. GUI image 200 can provide text menu 206 in a first area 202 and corresponding pie chart 208 in a second area 204. Text menu 206 provides a list of media assets or categories or classifications of media assets, and the particular content of text menu 206 can depend on user input. In the example shown in FIG. 2, a user has chosen to browse music assets by genre, and text menu 206 provides a list of genres (as indicated in menu title bar 210). Each entry 212a-d in text menu 206 includes the name of a genre (e.g., "alternative," "ambient," "dance," "punk") that is represented among stored media assets 140. (As used herein, a category is "represented" among stored media assets 140 if at least one stored media asset 140 belongs to that category.) Entries 212a-d can be presented in alphabetical order or any other order that may assist a user in locating a particular entry. Each entry 212a-d can also include other information, such as an indication of the number of artists associated with stored media assets that belong to each genre. If the number of genres represented exceeds the space available in area 202, a scroll bar, up/down arrows, or other GUI element (not explicitly shown) can be provided to allow the user to view different portions of the list.

Pie chart 208, which can be dynamically created by GUI engine 152, graphically represents a breakdown of music assets by genre. In this embodiment, each wedge 220a-e corresponds to a different genre listed in text menu 206. All genres can be represented at once in pie chart 208, even if not all genres are currently visible in area 202; thus, in this example pie chart 208 has 5 wedges 220a-e while only four text entries 212a-d are visible. Area 204 can also contain other information, such as an asset count 226 and/or a playing time indicator 224.

Figure 3:
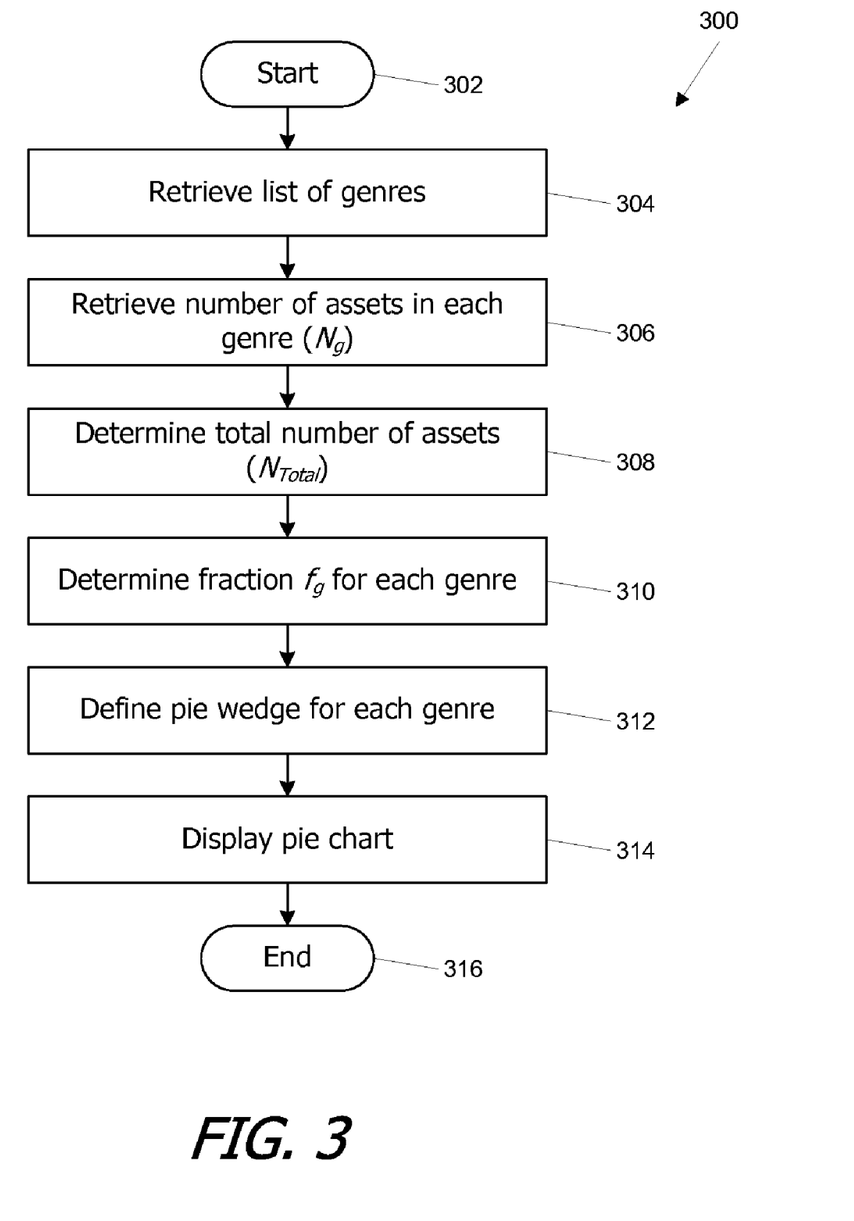
FIG. 3 is a flow diagram of a process that can be used to generate pie chart 208 according to an embodiment of the present invention.

The size of each pie wedge 220a-e can determined according to the relative quantities of assets of different genres stored on the PMD. FIG. 3 is a flow diagram of process 300 that can be used by GUI engine 152 to generate pie chart 208 according to an embodiment of the present invention. Process 300 can start (step 302), e.g., when a user selects database navigation by genre. At step 304, GUI engine 152 queries database engine 154 to obtain a list of all genres represented among stored media assets 140. This list can be used to generate text menu 206 as well as pie chart 208.

At step 306, GUI engine 152 can query database engine 154 to determine the number of assets ($N_g$) in each represented genre (g). Depending on the implementation of database engine 154, a single query may return all numbers $N_g$, or GUI engine 152 can make multiple queries, e.g., one for each genre g. At step 308, GUI engine 152 can determine the total number of represented media assets ($N_{Total}$), e.g., by summing $N_g$ over all genres g. At step 310, GUI engine 152 can compute a fraction $f_g = N_g/N_{Total}$, which represents the fraction of assets belonging to the genre g. It should be noted that where $N_{Total}$ is determined by summing over all $N_g$, the fractions $f_g$ will add to 1.

At step 312, GUI engine 152 can use the fractions $f_g$ to determine the size and position of the pie wedge associated with each genre. For example, multiplying $f_g$ by $2\pi$ provides the angle in radians subtended by the wedge. The orientation of each wedge can be determined from an arrangement rule for the wedges and the angle information. Various arrangement rules can be used. For instance, in one embodiment, adjacent pie wedges (e.g., wedges 220a and 220b in FIG. 2) correspond to adjacent items in text menu 206 (e.g., items 212a and 212b). Pie wedges can also be arranged in order of decreasing or increasing area (e.g., wedges might become successively smaller proceeding clockwise around the pie chart) or in any other convenient manner.

At step 314, GUI engine 152 can display the pie chart, and process 300 can end (step 316). The user can continue to interact with the resulting display, e.g., as described below.

It will be appreciated that process 300 is illustrative and that variations and modifications are possible. Steps described as sequential may be executed in parallel, order of steps may be varied, and steps may be modified or combined. In addition, measures other than number of tracks can be used to determine the sizes of the various pie wedges. For example, playing time for tracks in a given genre as a fraction of total playing time of all music tracks can be used.

In some embodiments, a track can be assigned to multiple genres. In process 300, tracks assigned to multiple genres can be counted as a separate track for each genre to which they belong. If the total number of tracks $N_{Total}$ is determined by summing the number of tracks in each genre as described above, the fractions $f_g$ add to 1 and a pie chart can be drawn as described above. Alternatively, the total number of tracks $N_{Total}$ can reflect the total number of distinct tracks, while the track is counted once for each genre it is in. This can result in the fractions $f_g$ summing to more than 1 to the extent that tracks are assigned to multiple genres. In this case, a pie chart can still be drawn if the wedges are allowed to overlap. Thus, the assignment of a track to multiple genres can be represented graphically, e.g., by overlapping adjacent pie wedges to the extent that the same track is associated with both genres. (If different colors are used for different wedges, the overlap can be highlighted, e.g., by blending the colors of the two wedges in the overlap region.)

Referring again to FIG. 2, GUI image 200 can include highlighting for one of the genres. For instance, a user can scroll up and/or down through text menu 206, causing each entry 212a-d to be highlighted in turn. FIG. 2 shows highlighting as a dotted box around ambient genre 212b. More generally, highlighting of a text menu entry can be accomplished by changing foreground and/or background colors, changing fonts, applying a text mark, or any other change that makes the highlighted entry distinctive from the rest.

As shown in FIG. 2, when the user highlights a particular entry (e.g., entry 212b) in text menu 206, the corresponding pie wedge (e.g., wedge 220b) can also be highlighted. Highlighting of a pie wedge can include, e.g., intensifying or changing the color of the highlighted wedge relative to non-highlighted wedges, enlarging the displayed wedge and shifting it outward from the pie, applying animations to the highlighted wedge (e.g., glistening, flashing, transitioning to a new color, expanding, shifting position), or the like. Thus, as the user scrolls through text menu 206 such that different ones of genres 212a-d are highlighted, different pie wedges 220a-d can also be highlighted in synchrony with the scrolling action. This can assist the user in identifying which pie wedge 220 corresponds to a given entry 212 in text menu 206, so that identifying legends or the like are not needed. If the pie wedges are arranged such that adjacent list items correspond to adjacent wedges, then scrolling the list can produce a pleasing circular-motion effect as highlighting shifts from one wedge to the next around the pie chart. Further, in some embodiments (e.g., where PMD 110 provides a touch screen interface), the user may select a pie wedge 220 and cause the corresponding text entry 212, as well as the selected pie wedge, to become highlighted.

In addition, as different genres are selected, asset count 226 and playing time indicator 224 can change to reflect the currently selected genre. Thus, for instance, in FIG. 2 asset count 226 indicates that the ambient genre includes 315 songs with a total playing time of 3.5 hours. If the user selects a different genre, these numbers can change accordingly. These indicators provide the user with additional information about how much content is available in each genre.

Figure 4:
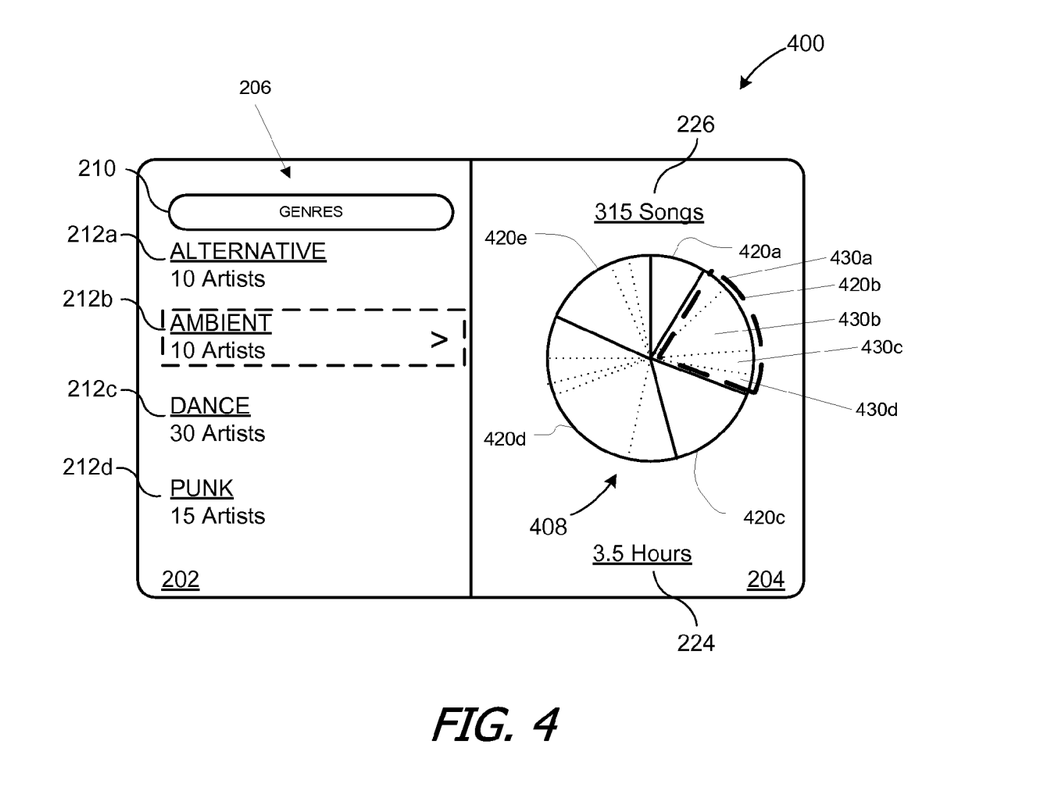
FIG. 4 illustrates another GUI image that can be generated and displayed according to an embodiment of the present invention.

In some embodiments, the pie chart may provide information. For example, FIG. 4 illustrates GUI image 400 that can be generated by GUI engine 152 and presented on display 135 of PMD 110 according to an embodiment of the present invention. GUI image 400 is generally similar to GUI image 200, except that certain pie wedges 420 in pie chart 408 (e.g., pie wedge 420b, 420d and 420e) have been subdivided as shown by dotted lines. Such subdivisions can be used to indicate a further breakdown of the media assets.

For example, in some embodiments, metadata 142 for a stored media asset 140 may include a sub-genre as well as a genre. Thus, assets 140 within the same genre (and therefore represented within the same pie wedge 420) can be further classified according to sub-genre. This classification is depicted in pie chart 408 by subdividing the wedges. For example, suppose that the ambient genre, which corresponds to wedge 420b, has four represented sub-genres ("ambient chill," "indie," "new age," and "adult alternative." Accordingly, wedge 420b can be subdivided into four sub-wedges 430a-d, each corresponding to one of the sub-genres. The relative size of each sub-wedge 430a-d can be determined based on the number of tracks in each sub-genre as a fraction of the total number of tracks in the parent genre; a process similar to process 300 can be used.

To delineate sub genres from one another or genres from one another, line weights of corresponding value may be used to distinguish one region from the other. For instance, a line weight lighter than that used to separate pie wedges for different genres may be used to distinguish sub-genres. Still further subdivisions (e.g., sub-sub-genres or artists within a sub-genre) could also be shown, e.g., by using still lighter line weights to represent the finer subdivisions or by using further graphical elements, such as dashes, dots, or herringbone embellishments to delineate different regions. In principle, subdivision can be represented all the way down a hierarchy to the level of a singe track.

Figure 5:
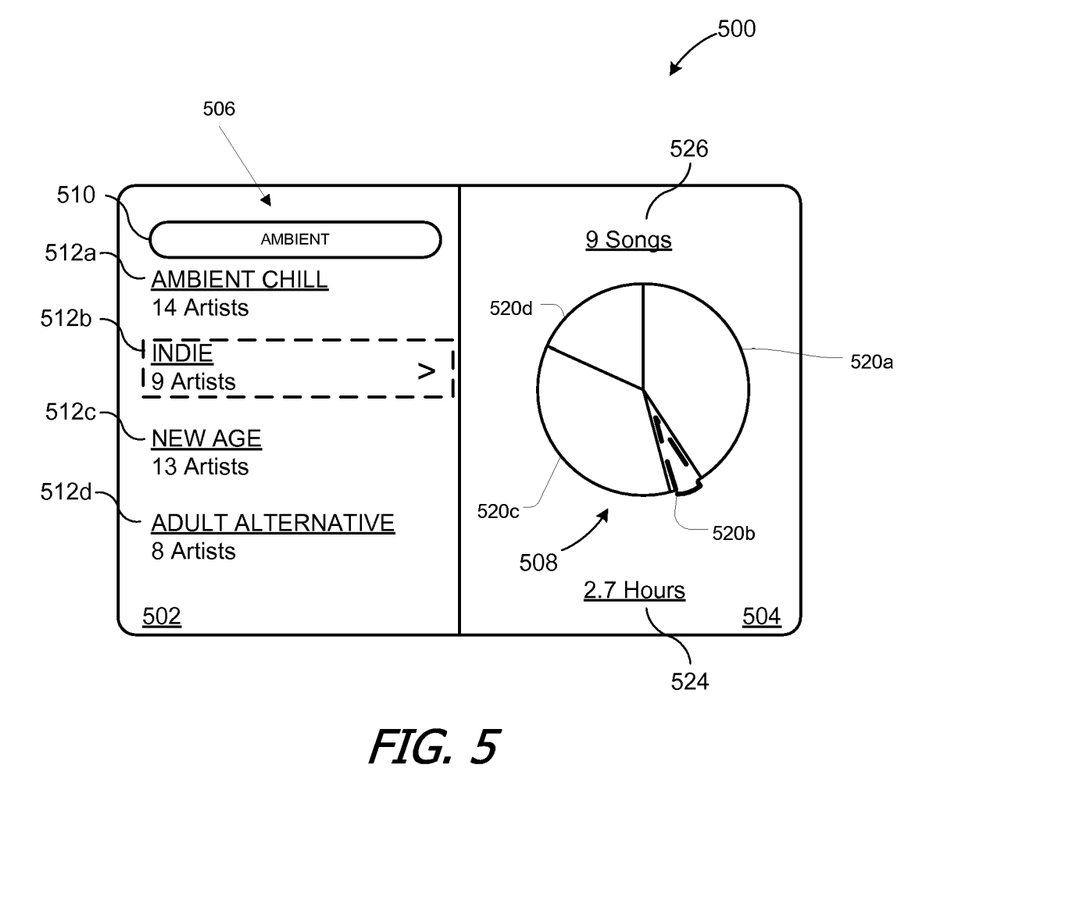
FIG. 5 illustrates still another GUI image that can be generated and displayed when a user navigates into a genre according to an embodiment of the present invention.

In another embodiment, a user viewing GUI image 200 of FIG. 2 or GUI image 400 of FIG. 4 can navigate into a currently selected genre. When this happens, GUI engine 152 can update the image to reflect the navigation. For example, FIG. 5 illustrates GUI image 500 that can be generated by GUI engine 152 when a user navigates into the ambient genre according to an embodiment of the present invention. As before, the display has a first area 502 that displays text menu 506 and a second area 504 that displays pie chart 508. Text menu 506 now lists sub-genres of the ambient genre, as indicated by title bar 210. Each entry 512a-d in text menu 506 includes the name of one of the sub-genres of the ambient genre that is represented among stored media assets 140, and each pie wedge 520a-d in pie chart 508 corresponds to one of entries 512a-d. GUI image 500 can be generated using a process similar to process 300 described above, except that the universe of assets is limited to assets in the ambient genre. Likewise, asset count 526 and playing time indicator 524 reflect the assets in a currently selected sub-genre (e.g., the indie sub-genre) of the ambient genre. This navigational procedure can be continued to sub-sub-genres, or to albums or songs within a sub-genre.

Figure 6:
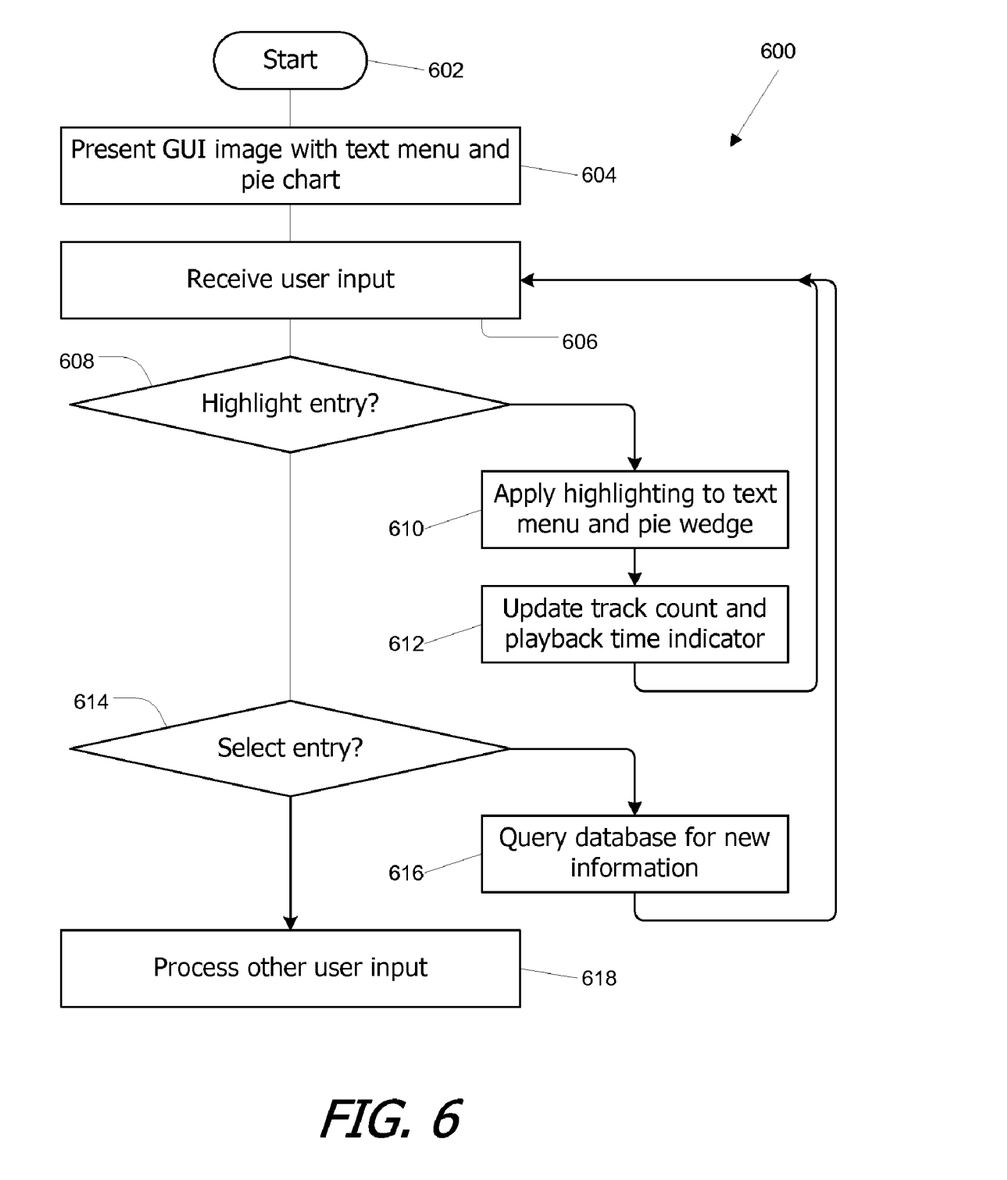
FIG. 6 is a flow diagram of a process that can be used to manage navigation according to an embodiment of the present invention.

FIG. 6 is a flow diagram of process 600 that can be implemented in GUI engine 152 to manage navigation according to an embodiment of the present invention. Process 600 starts (step 602), e.g., when database navigation is initialized. At step 604 GUI engine 152 presents an initial GUI image to the user, providing navigational options. The GUI image can include a text menu listing various options and a graphical representation corresponding to each option (e.g., a pie chart as described above). At step 606, GUI engine 152 can receive user input; process 600 can wait until user input is received. At step 608, GUI engine 152 can determine whether the user input changes which option should be highlighted (e.g., whether the user is scrolling though the options). If so, then at step 610, GUI engine 152 can update the GUI image by applying highlighting to both the text menu option and the graphical representation of that option. At step 612, GUI engine 152 can update other elements of the GUI image, such as the track count and playback time indicator described above. Process 600 can then return to step 606 to await further user input.

If, at step 608, the user input is not related to a change in highlighting, then at step 614 GUI engine 152 determines whether the user input relates to selecting one of the navigation options. If so, then at step 616, GUI engine 152 can query the database for new information based on the selected navigation option. GUI engine 152 uses the received information to generate a new GUI image and present that image to the user (step 604). Process 600 then returns to step 606 to await further user input based on the new GUI image.

At step 614, if the user input is not related to selecting one of the navigation options, process 600 can proceed to step 618 to process other types of user input. (Numerous examples of other types of user input and processing thereof are known in the art.) In some instances, processing other user input may result in returning to step 606 to await further input; in other instances, processing other user input may result in termination of process 600.

It will be appreciated that the various GUI images depicted in the drawings are illustrative and that variations and modifications are possible. Elements can be arranged differently, and visual presentation can use color and font in ways not shown herein. Identification of particular genres, sub-genres, asset counts and other information is provided solely for illustrative purposes and is not intended to be limiting of invention.

In addition, GUI images similar to those illustrated herein can be applied to other selections at other levels and paths of database navigation. For example, a user may initiate database navigation starting from a top-level menu that prompts the user to select a media type (e.g., Music, Movies, Television, Podcasts, Audiobooks, etc.). In a top-level GUI image, the various media types can be listed in a text menu in one area of a display, and a corresponding pie chart in another area of the display can indicate the relative quantity of each media type stored on the PMD. Similarly to embodiments described above, quantity can be based on number of tracks, playback time, file size or the like. As another example, a similar pie chart display could be created showing a breakdown of artists, e.g., as sub-wedges within a genre wedge or with pie wedges corresponding to different artists. In still other embodiments, pie chart displays can be used to show the breakdown of genres of stored movie (e.g., drama, comedy, action, science fiction); TV series episodes (with each wedge corresponding to a series); or to show any other distribution of content across some number of sub-types or sub-categories within a larger category. Consequently, at each stage of database navigation and browsing, the user can be presented with both textual and graphical representations of the distribution of media assets across various navigation options and can use this information to gain a better understanding of the breakdown of content stored on the PMD.

In another embodiment, the user can also view pie chart representations providing a breakdown of content within a user-created (or automatically generated) grouping of assets, such as a playlist. As used herein, a "playlist" is an ordered list of assets that have been grouped together such that they can be delivered to the playback engine of a PMD as a unit. The playback engine can receive the playlist and queue the assets on the list for playback; in some embodiments, the playback engine can either play the assets in listed order or can shuffle the list and play the assets in a random order; the user may be able to select whether or not a playlist is to be shuffled. Playlists can also be displayed for the user's perusal and selection of individual tracks.

Pie chart representations can be presented side-by-side with a playlist. For instance, a pie chart presented together with a playlist can show a breakdown of tracks on a playlist by genre, by artist, by album, or the like.

Figure 7:
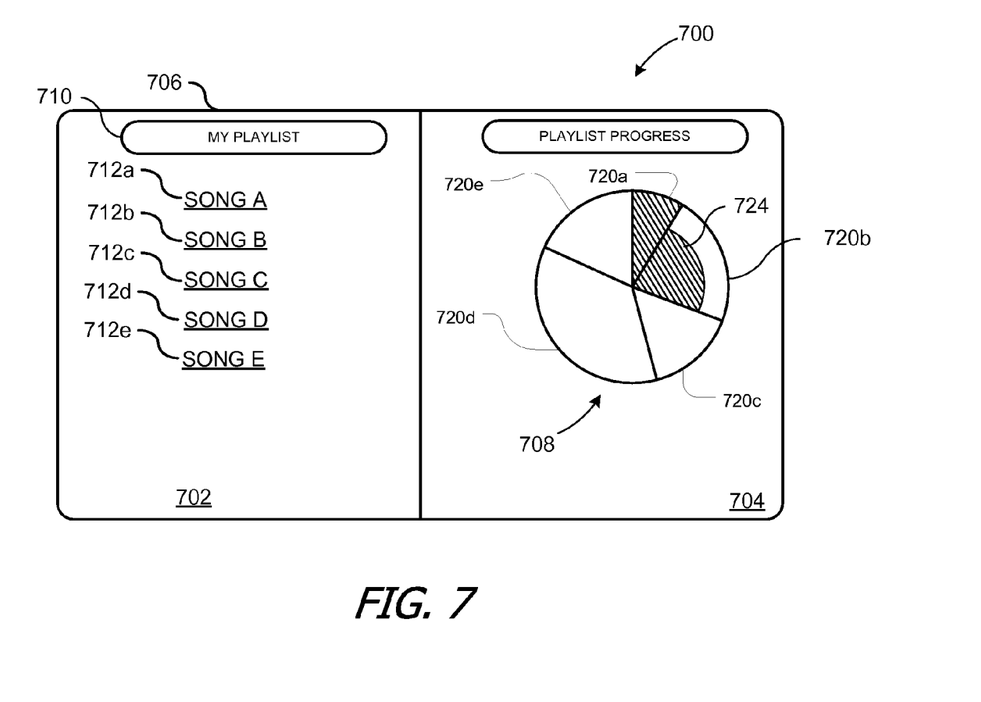
FIG. 7 illustrates another GUI image that can be generated according to an embodiment of the present invention.

In another embodiment, a pie chart can represent each track of the playlist as a pie wedge. The size can be proportional, e.g., to the relative duration of different tracks. FIG. 7 illustrates another GUI image 700 that can be generated by GUI engine 152 and presented on display 135 of PMD 110 according to an embodiment of the present invention. Area 702 displays a playlist 706 that is in the process of being played by PMD 110. Menu title bar 710 displays the name of the playlist and menu entries 712a-e list tracks on the playlist. As with other GUI images shown herein, if the number of tracks on the playlist exceeds the available space in area 702, scrolling techniques may be used to allow the user to view different portions of the playlist. A currently playing song, e.g., song 720b, is highlighted.

Area 704 displays pie chart 708 corresponding to playlist 706. Wedges 720a-e can be arranged such that adjacent wedges in the clockwise direction represent successive tracks 712a-e. In this example, the size of each pie wedge 720a-e is determined based on the length (playback time) of each track; thus, pie chart 708 provides visual information about the playback experience, such as how much of the total playback time will be consumed by different tracks. Highlighting can be used to indicate progress of playing the playlist. For example, wedges corresponding to tracks that have been played (e.g., wedge 720a) can be shown in one color as indicated by hatching, while wedges corresponding to tracks not yet played (e.g., wedges 720c-e) can be shown in another color. The wedge corresponding to the currently playing track (e.g., wedge 720b) can transition from the not-played color to the played color as the track plays; for example, played-color area 724 can expand outward as the track plays. Accordingly, GUI image 700 can aid a user in visualizing progress of playing a playlist.

GUI image 700 may also include other information, such as the track length and current playback point within the current track; title, artist, and album name for the current track; album artwork or lyrics related to the current track; or the like.

While the invention has been described with respect to specific embodiments, one skilled in the art will recognize that numerous modifications are possible. For example, while pie charts are used herein as graphical elements illustrating the relative proportions of different kinds of content, other graphical elements can be substituted, such as bar graphs where the height or length of each bar corresponds to the quantity of a particular category or sub-category of asset that is present. The bar graph can be normalized such that the tallest or longest bar is always the same size to provide a clear sense of relative proportion. As another alternative, fill charts can be used, where different portions of a single bar are filled to represent the proportions of different categories of content. In addition, the relative quantity of assets in different categories can be determined according to different measures of quantity; examples include number of assets, track length (or playback time) of the assets, size of the asset data (e.g., in bytes), or any other measure that can provide the user with helpful information as to relative quantity. In some embodiments, different measures may be used for graphically representing different categorizations, and the GUI image may include an indication of the measure used to generate a particular representation. A user may also be able to select a desired measure, thus customizing the display.

Any categorization supported by the metadata associated with stored assets can be used as the basis of a graphical representation. Thus, for example, a user might be able to view tracks grouped according to user rating, number of times played, or the like. Different graphical representations can be used for presenting different groupings of data; for instance, bar graphs may be well suited to presenting information such as user rating or number of times played, where the possible category values correspond to numbers, allowing the bars to be arranged in numerical order.

In some embodiments, color can be used to represent some characteristic of an asset. For example, consider a pie wedge representing tracks in a particular genre. These tracks can be divided based on some further characteristic, such as whether the artist is normally associated with that genre or has crossed over from a different genre in creating a particular track. Different colors (e.g., different intensities of the same color or primary vs. secondary colors) can be used to indicate the strength of an artist's association with a genre. As another example, color might be used to distinguish "live" recordings from studio recordings, original recordings from remixes, or the like.

It may be possible for one asset to belong to multiple categories on a list of categories, e.g., to multiple genres or sub-genres. In some embodiments, where a particular asset may be a member of two sub genres, the graphical representations of the two sub genres may be positioned adjacent to one another in the overall graphical representation (e.g., in FIG. 4, the sub-wedges corresponding to overlapping sub-genres may be adjacent and may overlap, e.g., as described above.

Further, in addition to or instead of color, fill patterns, shades, glittering, animation, or other visual distinctions may be used to distinguish tracks, indicate highlighting, or the like. It may also be possible, by using multiple graphical delineations (e.g., hue, intensity, lines, embellishments and the like), to present more than one aspect of metadata at one time in one display for a library of assets. In other embodiments, a user may be able to define or select highlighting schemes and thus customize the display to his or her tastes.

Graphical interfaces as described herein can also be implemented in a media asset management application executing on a host computer to which a portable media device can connect from time to time. Thus, for example, the user may be able to use the host computer's interface to view and interact with graphical information descriptive of stored media assets on a portable media device. The interface may provide other information, e.g., using contrasting colors, color intensity, or other color information to indicate changes in the composition of the database. For instance, in a pie wedge corresponding a particular genre, contrasting colors might be used to signal a distinction between newly added tracks in that genre and previously added tracks.

Thus, although the invention has been described with respect to specific embodiments, it will be appreciated that the invention is intended to cover all modifications and equivalents within the scope of the following claims.

What is claimed is:

1. A computer-implemented method of graphically representing media assets stored on a portable media device, the method comprising:
   presenting, on a first portion of a display of the portable media device, a listing of a plurality of values of a first metadata item associated with the media assets, wherein each value of the first metadata item is associated with at least one of the media assets in an initial set of media assets;
   determining a distribution of the media assets across the plurality of values of the first metadata item based on a count of the media assets that are associated with each of the plurality of values of the first metadata item; and
   presenting, on a second portion of the display, a graphical representation comprising a plurality of elements, each element being associated with a different one of the plurality of values of the first metadata item, wherein each element has a size and the sizes of the elements relative to each other represent the distribution of the media assets in the initial set of media assets across the plurality of values of the first metadata item.

2. The method of claim 1 further comprising:
   receiving user input selecting one of the listed values of the first metadata item;
   highlighting the selected value of the first metadata item on the listing; and
   highlighting the element of the graphical representation that corresponds to the selected value.

3. The method of claim 2 wherein highlighting the selected value of the first metadata item on the listing includes changing at least one of a foreground color, a background color, or a font feature of an entry in the listing that corresponds to the selected value relative to other entries in the listing.

4. The method of claim 2 wherein highlighting the element of the graphical representation includes changing at least one of a color value for the element, a color intensity for the element, a pattern applied to the element, or a size of the element relative to other elements of the graphical representation.

5. The method of claim 2 wherein highlighting the element of the graphical representation includes changing at least one of a line width for a line defining a boundary of the element or a line style for the line defining a boundary of the element.

6. The method of claim 2 wherein highlighting the element of the graphical representation includes animating the element.

7. The method of claim 1 further comprising:
   receiving user input selecting one of the plurality of values of the first metadata item;
   identifying a subset of the media assets, wherein each media asset in the subset is associated with the selected value of the first metadata item;
   presenting, on the first portion of the display, a new listing of a plurality of values of a second metadata item associated with the media assets in the subset of the media assets, wherein each value of the second metadata item is associated with at least one of the media assets in the subset of the media assets; and
   presenting, on the second portion of the display, a new graphical representation comprising a plurality of new elements, each new element being associated with a different one of the plurality of values of the second metadata item, wherein each new element has a size and the sizes of the new elements relative to each other represent a distribution of the media assets in the subset of the media assets across the plurality of values of the second metadata item.

8. The method of claim 1 wherein the graphical representation comprises a pie chart and each element is a wedge of the pie chart.

9. The method of claim 8 wherein an angle subtended by each of the wedges is proportional to a fraction equal to a number of media assets in the initial set of media assets that are associated with the corresponding one of the plurality of values of the first metadata item divided by a total number of media assets in the initial set of media assets.

10. The method of claim 8 wherein each of the media assets has a track length and wherein an angle subtended by each of the wedges is proportional to a fraction equal to a sum of the track lengths of the media assets in the initial set of media assets that are associated with the corresponding one of the plurality of values of the first metadata item divided by a sum of the track lengths of all media assets in the initial set of media assets.

11. The method of claim 8 wherein each of the media assets has a file size and wherein an angle subtended by each of the wedges is proportional to a fraction equal to a sum of the file sizes of the media assets in the initial set of media assets that are associated with the corresponding one of the plurality of values of the first metadata item divided by a sum of the file sizes of all media assets in the initial set of media assets.

12. The method of claim 8 further comprising, for at least a first one of the wedges of the pie chart, the first one of the wedges corresponding to a first value of the first metadata item:
   selecting a second metadata item having a plurality of values;
   for each of the media assets associated with the first value of the first metadata item, determining a value of the second metadata item; and
   presenting, on the display, the first one of the wedges as being subdivided into a plurality of sub-wedges, each one of the sub-wedges being associated with a different one of the plurality of values of the second metadata item, wherein each sub-wedge has a size and the sizes of the sub-wedges relative to each other represent a distribution of the media assets associated with the first value of the first metadata item across the plurality of values of the second metadata item.

13. The method of claim 12 wherein the first item of metadata corresponds to a first classification of the media assets and the second item of metadata corresponds to a sub-classification of the media assets within the first classification.

14. The method of claim 13 wherein the first item of metadata corresponds to a genre and the second item of metadata corresponds to a sub-genre.

15. The method of claim 12 wherein the first item of metadata corresponds to a first classification of the media assets and the second item of metadata corresponds to a second classification of the media assets that is independent of the first classification.

16. The method of claim 15 wherein the first item of metadata corresponds to a genre and the second item of metadata corresponds to an artist.

17. The method of claim 1 wherein the first metadata item corresponds to a genre.

18. The method of claim 1 wherein the first metadata item corresponds to an artist.

19. The method of claim 1 wherein the first metadata item is an item selected from a group consisting of a genre, an artist, a user rating, and a media type.

20. A computer-implemented method of graphically representing media assets stored on a portable media device, the method comprising:
   presenting, on a first portion of a display of the portable media device, a listing of a plurality of values of a first metadata item associated with the media assets, wherein each value of the first metadata item is associated with at least one of the media assets in an initial set of media assets;
   determining a distribution of the media assets across the plurality of values of the first metadata item based on respective track lengths of the media assets that are associated with each of the plurality of values; and
   presenting, on a second portion of the display, a graphical representation comprising a plurality of elements, each element being associated with a different one of the plurality of values of the first metadata item, wherein each element has a size and the sizes of the elements relative to each other represent the distribution of the media assets in the initial set of media assets across the plurality of values of the first metadata item.

21. A computer-implemented method of graphically representing media assets stored on a portable media device, the method comprising:
   presenting, on a first portion of a display of the portable media device, a listing of a plurality of values of a first metadata item associated with the media assets, wherein each value of the first metadata item is associated with at least one of the media assets in an initial set of media assets;
   determining a distribution of the media assets across the plurality of values of the first metadata item based on file sizes of the media assets that are associated with each of the plurality of values: and
   presenting, on a second portion of the display, a graphical representation comprising a plurality of elements, each element being associated with a different one of the plurality of values of the first metadata item, wherein each element has a size and the sizes of the elements relative to each other represent the distribution of the media assets in the initial set of media assets across the plurality of values of the first metadata item.

22. A graphical user interface for a portable media device having a store of media assets, the graphical user interface comprising:
   a user input control operable by a user to make a selection;
   a first display area configured to display a list having a plurality of entries, each entry corresponding to a different one of a plurality of values for a metadata item, wherein each of the entries on the list is selectable by operation of the user input control;
   a second display area configured to display a plurality of graphical elements, each graphical element corresponding to a different one of the plurality of values of the metadata item, wherein a size of each element indicates a proportion of the media assets stored by the portable media player that have the value of the corresponding metadata item, wherein the proportion is determined based on a count of the media assets that are associated with each of the plurality of values; and
   a processor configured to receive a user selection of one of the entries on the list from the user input control and to update the list area and the graphical representation area to highlight both the selected entry and the one of the graphical elements that corresponds to the same value of the metadata item as the selected entry.

23. The graphical user interface of claim 22 wherein the first display area and the second display area are different portions of a single display screen.

* * * * *

UNITED STATES PATENT AND TRADEMARK OFFICE
CERTIFICATE OF CORRECTION

| | | |
|---|---|---|
| PATENT NO. | : 7,904,485 B2 | Page 1 of 1 |
| APPLICATION NO. | : 12/036954 | |
| DATED | : March 8, 2011 | |
| INVENTOR(S) | : William Bull et al. | |

It is certified that error appears in the above-identified patent and that said Letters Patent is hereby corrected as shown below:

In column 1, line 9, delete "4," and insert -- 6, --, therefor.

In column 7, line 51, delete "singe" and insert -- single --, therefor.

In column 14, line 4, in Claim 21, delete "values:" and insert -- values; --, therefor.

Signed and Sealed this
Fifteenth Day of November, 2011

David J. Kappos
*Director of the United States Patent and Trademark Office*